(12) United States Patent
Vuong et al.

(10) Patent No.: US 9,305,118 B2
(45) Date of Patent: Apr. 5, 2016

(54) SELECTING SEARCH RESULT IMAGES BASED ON COLOR

(71) Applicant: Wal-Mart Stores, Inc., Bentonville, AR (US)

(72) Inventors: Ba-Quy Vuong, Foster City, CA (US); Abhishek Gattani, Sunnyvale, CA (US); Namrata PramodKumar Tholiya, Sunnyvale, CA (US)

(73) Assignee: Wal-Mart Stores, Inc., Bentonville, AR (US)

( * ) Notice: Subject to any disclaimer, the term of this patent is extended or adjusted under 35 U.S.C. 154(b) by 74 days.

(21) Appl. No.: 13/730,748

(22) Filed: Dec. 28, 2012

(65) Prior Publication Data

US 2014/0188842 A1 Jul. 3, 2014

(51) Int. Cl.
*G06F 17/30* (2006.01)

(52) U.S. Cl.
CPC ...... *G06F 17/30991* (2013.01); *G06F 17/3025* (2013.01); *G06F 17/30675* (2013.01)

(58) Field of Classification Search
CPC .......... G06Q 30/0601; G06Q 10/0637; G06Q 30/0621; G06Q 10/087; G06Q 30/02; G06Q 30/0246; G06Q 50/22; G06Q 10/06; G06Q 10/063; G06Q 10/0635; G06Q 10/107; G06Q 20/00; G06Q 30/00; G06Q 30/0222
USPC ......... 715/738, 753, 733, 226, 234, 253, 719, 715/744, 746, 747; 707/769, E17.014, 722, 707/E17.03, E17.044, 706, 708, 710, 731, 707/732, 737, 753, 812; 709/203, 206, 213; 705/14.43, 12, 14.23, 14.49, 14.53, 2, 705/26.1, 26.5, 26.63, 30, 7.11, 7.36
See application file for complete search history.

(56) References Cited

U.S. PATENT DOCUMENTS

| | | | |
|---|---|---|---|
| 5,751,450 A | 5/1998 | Robinson | |
| 5,949,904 A | 9/1999 | Delp | |
| 7,519,548 B2 * | 4/2009 | Hanechak et al. | ........... 705/26.5 |
| 7,536,059 B2 | 5/2009 | Xu et al. | |
| 7,657,100 B2 | 2/2010 | Gokturk | |
| 8,249,398 B2 | 8/2012 | Lee | |
| 8,406,573 B2 | 3/2013 | Wang | |
| 8,576,241 B1 | 11/2013 | Kanter | |
| 8,577,134 B2 | 11/2013 | Tirumalareddy | |
| 8,611,695 B1 | 12/2013 | Han | |
| 8,655,648 B2 | 2/2014 | Kulkarni et al. | |
| 8,699,826 B2 | 4/2014 | Remedios | |
| 8,712,156 B2 | 4/2014 | Bronstein | |
| 2003/0217052 A1 * | 11/2003 | Rubenczyk et al. | .............. 707/3 |
| 2003/0231185 A1 | 12/2003 | Kupersmit | |
| 2004/0101156 A1 | 5/2004 | Kacker | |
| 2006/0047580 A1 | 3/2006 | Saha | |
| 2007/0018906 A1 | 1/2007 | Visnovsky et al. | |

(Continued)

*Primary Examiner* — Jay Morrison
*Assistant Examiner* — Ken Hoang
(74) *Attorney, Agent, or Firm* — Bryan Cave LLP

(57) ABSTRACT

Example systems and methods that select search result images are described. In one implementation, a method accesses a ranking of multiple products associated with a search query and identifies a reference to a color in the search query. The method identifies a first product from the ranking of multiple products and identifies multiple product images associated with the first product. A color determination is made regarding each of the multiple product images. A product image having an associated color that is most similar to the color in the search query is selected for presentation in the search results.

17 Claims, 10 Drawing Sheets

(56) References Cited

U.S. PATENT DOCUMENTS

| | | |
|---|---|---|
| 2007/0223811 A1 | 9/2007 | Kudo |
| 2008/0046410 A1* | 2/2008 | Lieb .................................. 707/3 |
| 2008/0046424 A1* | 2/2008 | Horton ............................. 707/6 |
| 2008/0082518 A1 | 4/2008 | Loftesness |
| 2008/0089615 A1 | 4/2008 | Shiiyama |
| 2008/0118151 A1 | 5/2008 | Bouguet |
| 2008/0152225 A1 | 6/2008 | Iwamoto |
| 2008/0154608 A1 | 6/2008 | Evermann et al. |
| 2008/0154747 A1 | 6/2008 | Tarbell |
| 2010/0049707 A1* | 2/2010 | Faria et al. ........................ 707/5 |
| 2010/0158412 A1 | 6/2010 | Wang et al. |
| 2011/0191334 A1 | 8/2011 | Hua |
| 2011/0235902 A1* | 9/2011 | Chittar et al. ................. 382/162 |
| 2012/0185472 A1 | 7/2012 | Ahmed et al. |
| 2012/0296926 A1 | 11/2012 | Kalin et al. |
| 2013/0022264 A1 | 1/2013 | Atsmon |

* cited by examiner

SELECTING SEARCH RESULT IMAGES BASED ON COLOR

TECHNICAL FIELD

The present disclosure relates to systems and methods that select search result images based on a reference to a color in a search query.

BACKGROUND

Purchasers of products or services may perform various search queries to locate a desired product or service. In some situations, the purchaser may include one or more characteristics of the desired product or service, such as color, size, product type, and the like. However, many existing search engines do not properly select products or services that have the desired characteristics. Instead, at least a portion of the search results displayed to the purchaser are not what the purchaser desired. Further, many existing search engines do not properly rank the search results based on the desired characteristics provided by the purchaser.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1:
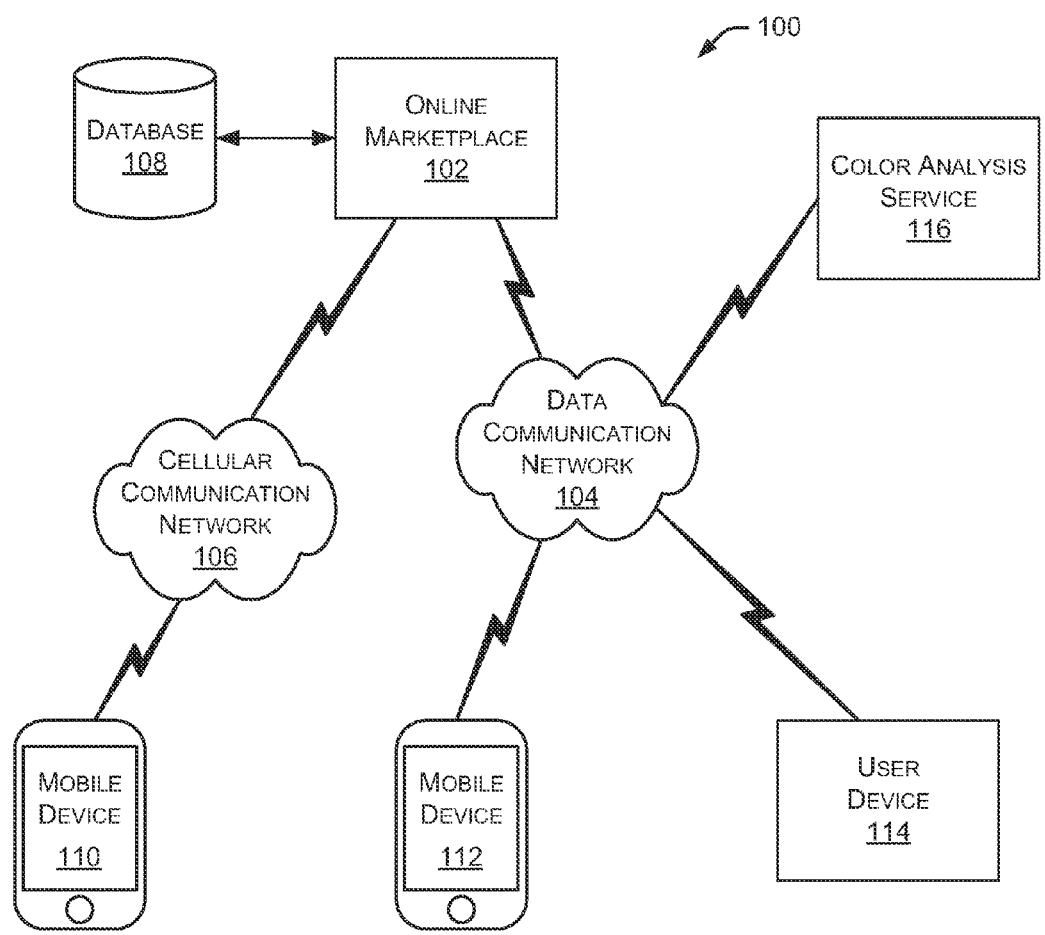
FIG. 1 is a block diagram depicting an environment within which an example embodiment may be implemented.

In the following description, reference is made to the accompanying drawings that form a part thereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

The systems and methods described herein generate search results based on references to one or more colors in a search query submitted by a user. As described herein, a product search query is received from a user. The product search query is analyzed to identify a reference to a color in the product search query. The search query is executed to identify multiple products arranged in an initial ranking order. A title and/or description of each of the multiple products are analyzed to identify references to color. A modified ranking of the multiple products is created by increasing the raking of products that include a reference to the color in the title and/or description.

FIG. 1 is a block diagram depicting an environment 100 within which an example embodiment may be implemented. Environment 100 includes an online marketplace 102 coupled to a data communication network 104, such as the Internet, and a cellular communication network 106. Online marketplace 102 includes any type of Web site or online service that is accessible by one or more users to purchase any type of product or service. Online marketplace 102 may be implemented using one or more systems and/or services, such as web-based servers and the like. A particular online marketplace 102 may offer products or services associated with a single entity (e.g., a single merchant) or from multiple different entities. In some embodiments, online marketplace 102 is implemented by the entity (e.g., merchant) offering the products or services. Online marketplace 102 may also be referred to as an "ecommerce site," an "ecommerce marketplace," or an "online ecommerce marketplace." Online marketplace 102 is also coupled to a database 108, which stores, for example, information associated with the products and services available through online marketplace 102. In some embodiments, database 108 stores data utilized by one or more servers to implement online marketplace 102.

Online marketplace 102 communicates with various systems, services, and devices through data communication network 104. Data communication network 104 may utilize any communication protocol and any type of communication medium. In some embodiments, data communication network 104 is a combination of two or more networks coupled to one another. Online marketplace 102 also communicates with various systems and devices, such as mobile devices, through cellular communication network 106, which may utilize any communication protocol and any type of communication medium. In some embodiments, cellular communication network 106 is a combination of two or more networks coupled to one another.

As shown in environment 100, a mobile device 110 communicates with online marketplace 102 through cellular communication network 106. Although a single mobile device 110 is shown in FIG. 1, particular embodiments may include any number of mobile devices (and non-mobile devices) communicating with online marketplace 102 through cellular communication network 106. A second mobile device 112 communicates with online marketplace 102 through data communication network 104. Although one mobile device 112 is shown communicating through data communication network 104, particular embodiments may include any number of mobile devices communicating with online marketplace 102 through data communication network 104. Mobile devices 110 and 112 include any type of device capable of communicating with online marketplace 102 through cellular communication network 106 or data communication network 104, such as a cellular phone, a smart phone, a tablet computer, a laptop computer, a desktop computer, a portable entertainment device, a portable gaming device, and the like.

Additionally, a user device 114 communicates with online marketplace 102 through data communication network 104. User device 114 includes any type of device capable of communicating with online marketplace 102 through data communication network 104, such as a smart phone, a tablet computer, a laptop computer, a desktop computer, a portable entertainment device, a portable gaming device, a game console, a set top box, and the like.

An optional color analysis service 116 is also coupled to data communication network 104. Color analysis service 116 performs various functions related to the identification and analysis of colors in a search query, as discussed herein. For example, color analysis service 116 may analyze a particular color referenced in a search query to identify similar colors, such as identifying the color "pink" as being similar to the color "red." Although a single color analysis service 116 is shown in FIG. 1, particular environments 100 may include any number of different color analysis services 116 coupled to data communication network 104. In alternate embodiments, one or more color analysis services are coupled directly to online marketplace 102. In further embodiments, one or more color analysis services or algorithms are contained within online marketplace 102.

Figure 2:
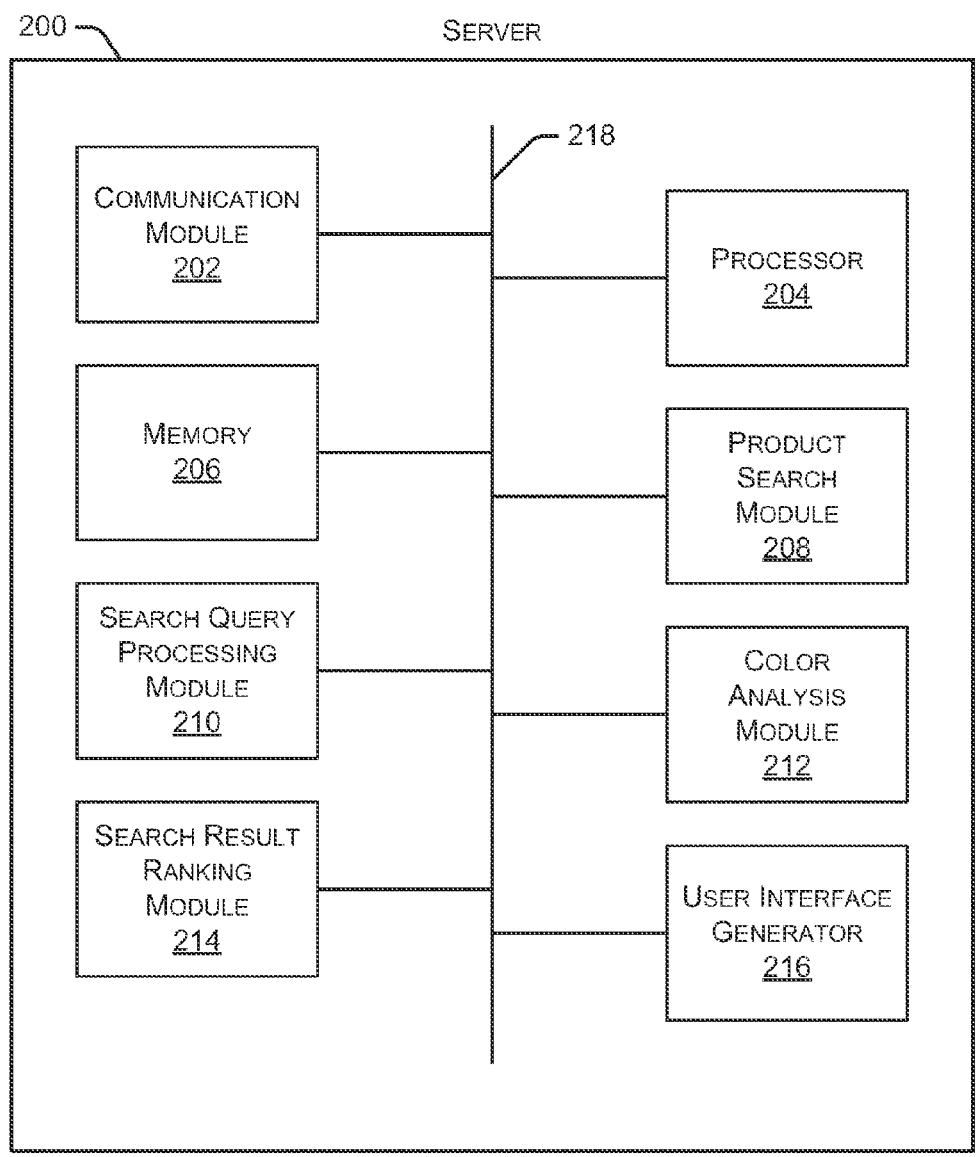
FIG. 2 is a block diagram depicting an embodiment of a server associated with an online marketplace.

FIG. 2 is a block diagram depicting an embodiment of a server 200 associated with online marketplace 102. Server 200 performs various functions related to the operation of online marketplace 102, as discussed herein. In some embodiments, online marketplace 102 includes multiple servers 200 that cooperatively implement the functions described herein. Server 200 includes a communication module 202, a processor 204, and a memory 206. Communication module 202 allows server 200 to communicate with other systems, such as communication networks, other servers, mobile devices 110 and 112, user device 114, color analysis service 116, and the like. Processor 204 executes various instructions to implement the functionality provided by server 200. Memory 206 stores these instructions as well as other data used by processor 204 and other modules contained in server 200.

Server 200 also includes product search module 208, which handles the receiving and processing of product search queries (or product search requests) from multiple users. In some embodiments, product search module 208 supports various product search techniques, such as a keyword search, a category search, a department search, a brand search, and the like. In particular implementations, users interact with server 200 through a user interface to search for desired products or services. A search query processing module 210 performs, for example, various operations associated with the processing of product search queries received from multiple users. As discussed herein, search query processing module 210 may execute a search query to identify potential products or services of interest to the user. In some embodiments, execution of the search query identifies multiple products that are initially ranked based on a likelihood of interest to the user providing the search query (e.g., products with a highest likelihood of interest to the user are presented at the top of the ranking).

A color analysis module 212 performs various functions associated with identifying references to one or more colors in a search query. As discussed herein, any reference to a color in a search query may affect the ranking of the search results presented to the user. Thus, color analysis module 212 may communicate with search query processing module 210 and a search result ranking module 214 to assist with the creation of appropriately ranked search results. In some embodiments, search result ranking module 214 may determine an initial ranking based on an initial execution of the search query submitted by the user. As discussed herein, search results ranking module 214 may then modify the initial ranking of the search results based on references to color in the search query and other factors.

Server 200 further includes a user interface generator 216 that creates data to present various user interfaces to a user of mobile device 110, 112, or user device 114. Example user interfaces include search query input interfaces, product or service listings based on the results of executing the search query, and the like. A data communication bus 218 allows the various systems and components of server 200 to communicate with one another.

Figure 3:
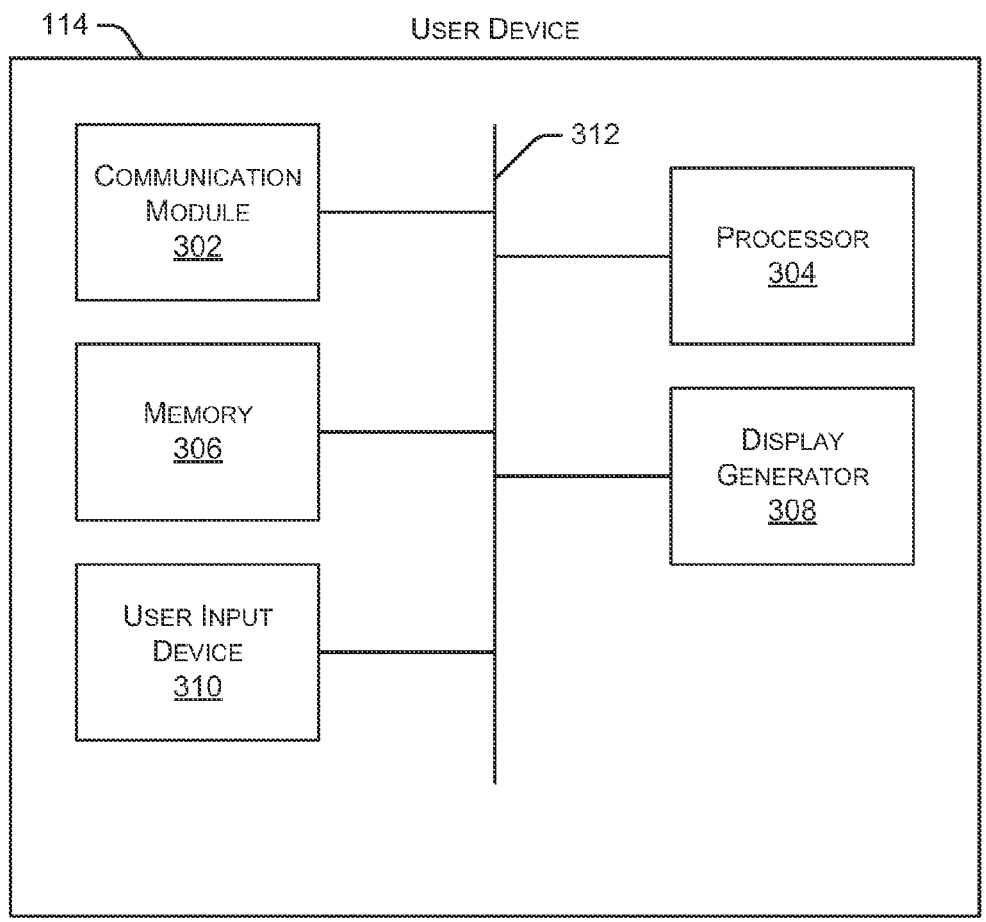
FIG. 3 is a block diagram depicting an embodiment of a user device.

FIG. 3 is a block diagram depicting an embodiment of user device 114. User device 114 is operated by a user to interact with online marketplace 102 to search for products or services, obtain information about various products or services, place orders, and the like. User device 114 includes a communication module 302, a processor 304, and a memory 306. Communication module 302 allows user device 114 to communicate with other systems, such as communication networks, other user devices, online marketplace 102, and the like. Processor 304 executes various instructions to implement the functionality described herein with respect to user device 114. Memory 306 stores these instructions as well as other data used by processor 304 and other modules contained in user device 114.

User device 114 also includes a display generator 308, which generates various signals that enable a display device to present information to a user of the device. In some embodiments, display generator 308 generates various signals that present a user interface to the user of user device 114. This user interface allows a user to, for example, submit a product search query to online marketplace 102. A user input device 310 allows a user to interact with user device 114. Example user input devices 310 include pointing devices, buttons, switches, touch-sensitive portions of a touch-sensitive display device, and the like. A data communication bus 312 allows the various systems and components of user device 114 to communicate with one another. In some embodiments, systems and components similar to those discussed above with respect to user device 114 are included in mobile devices 110 and 112.

Figure 4A:
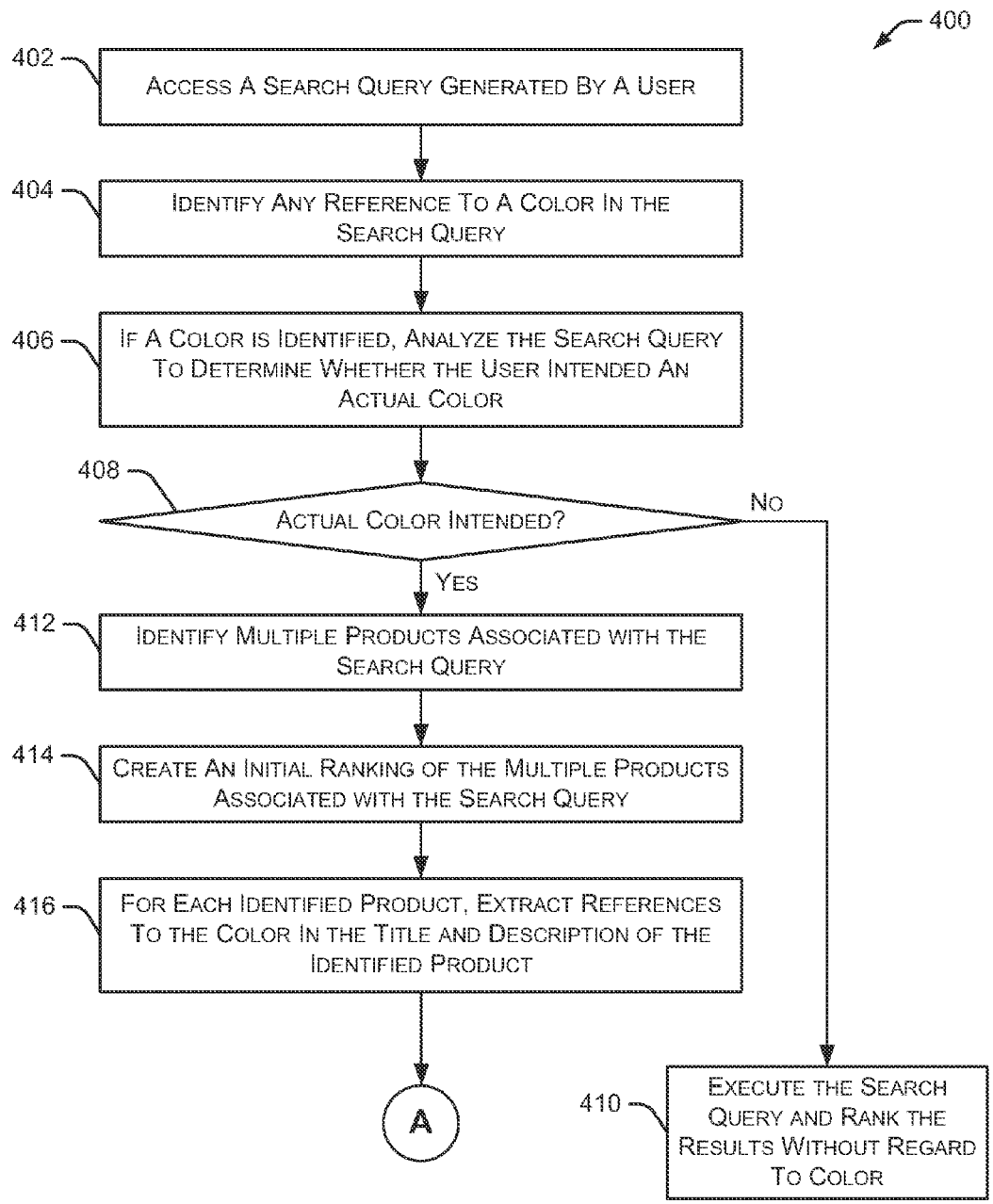
FIGS. 4A and 4B represent a flow diagram depicting an embodiment of a method for ranking search results based on color.
Figure 4B:
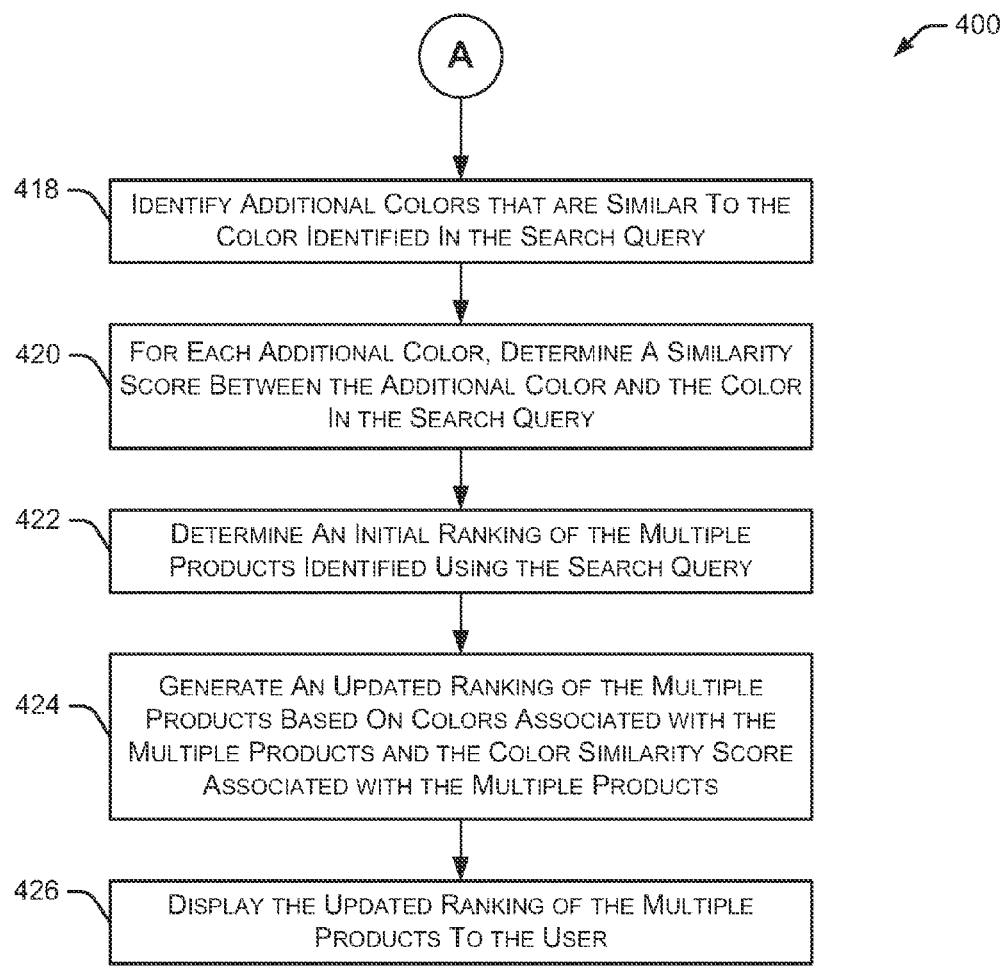

FIGS. 4A and 4B represent a flow diagram depicting an embodiment of a method 400 for ranking search results based on color. The example of method 400 describes the identification of multiple products based on a user's search query. In alternate embodiments, similar procedures may be utilized to identify multiple services or other items based on the search query. Further, the method 400 can be applied to any type of search query (e.g., keyword search, category search, and department search) related to any number of merchants and online marketplaces.

Initially, the method 400 accesses a search query generated by a user at 402. As mentioned above, method 400 may be applied to any type of search query (or combination of multiple types of search queries). For this example, the search query includes at least one keyword entered by the user. The search query may be accessed from another system or may be received directly from the user. The method 400 analyzes the search query to identify any references to a color in the search query at 404. For example, a search query "brown leather jacket" includes a reference to the color "brown," whereas a search query "small leather jacket" does not include any reference to color. Some search queries may contain references to multiple colors, such as "red or pink purse." In some embodiments, each word or term in a search query is compared against a database (or other data listing) of known color terms to identify references to a color in the search query.

If a color is identified in the search query, the method 400 analyzes the search query to determine whether the user intended an actual color in the search query at 406. In some situations, a user may include a term in a search query that matches a known color term, but the user did not intend the term to identify an actual color. For example, a search query for "Red Sox shirt" is referring to the baseball team "Red Sox", not the color red. In this example, the user did not intend an actual color, so the term "red" is not considered in modifying the rankings of the search results. Referring to FIG. 4A, if an actual color is not intended at 408, the method 400 executes the search query and ranks the results without regard to color at 410. Various techniques are available to determine whether a user intended an actual color in a search query. In some embodiments, the terms in the search query are compared to a listing of known phrases that include a color term, but do not intend an actual color. Examples include "Red Sox," "White Sox," and "white water rapids." In other embodiments, a user's intent is determined by comparing cosine similarity between vectors, as discussed below with reference to the example of FIG. 5.

However, if an actual color is intended at 408, the method 400 identifies multiple products associated with the search query at 412 and creates an initial ranking of the multiple products associated with the search query at 414. A color associated with a particular product is determined, for example, based on a title of the product, a description of the product, a color parameter associated with the product, and the like. For each identified product, the method 400 extracts references to the color in the title and description of the identified product at 416.

Referring to FIG. 4B, the method 400 continues by identifying additional colors that are similar to the color identified in the search query at 418. For each additional color that is similar to the color term in the search query, the method 400 determines a color similarity score between the additional color and the color term in the search query at 420. Additional details regarding the calculation of a color similarity score are discussed below with respect to FIG. 6.

The method 400 continues by determining an initial ranking of the multiple products identified using the search query at 422. An updated ranking of the multiple products is generated at 424 based on colors associated with the multiple products and the color similarity score associated with the multiple products. For example, consider a situation where two products initially have a similar ranking based on a search query that includes a color term. If one of the products has a color identical to the color term in the search query and the other product has a different color (or dissimilar color), the product with the identical color will be ranked ahead of the other product. Additionally, if both products have colors that are similar to the color term in the search query, the product with the highest color similarity will be ranked ahead of the other product. The method 400 concludes by displaying the updated ranking of the multiple products to the user at 426. In alternate embodiments, the method 400 generates data that is used by another device or system to present the updated ranking of the multiple products to the user. In some embodiments, a score is assigned to each of the multiple products and the ranking of the multiple products is performed based on the assigned score. In a particular implementation, the BM25F ranking function is used to rank the multiple products.

In alternate embodiments, the method 400 is performed without identifying or analyzing additional colors that are similar to the color in the identified search query. In these alternate embodiments, the method 400 does not consider color similarity when ranking the search results. Instead, the method 400 considers exact color matches between colors identified in the user search query and colors associated with the multiple products associated with the search query when ranking the multiple products.

As noted above, a color associated with a particular product may be determined based on a title of the product, a description of a product, a color parameter associated with the product, and the like. In some embodiments, products available in an online marketplace are periodically analyzed to identify color attributes associated with the products. For example, if a particular product does not have a color associated with a "color field" describing the product, a procedure analyzes all data associated with the product to determine one or more colors associated with the product. For example, the title, description, and features of a product are analyzed to identify actual colors associated with the product. If one or more colors are identified, those colors are added to a "color field" related to that product. In some embodiments, the title, description, and features of a product are analyzed using the systems and methods described herein to identify actual colors associated with the product.

Figure 5:
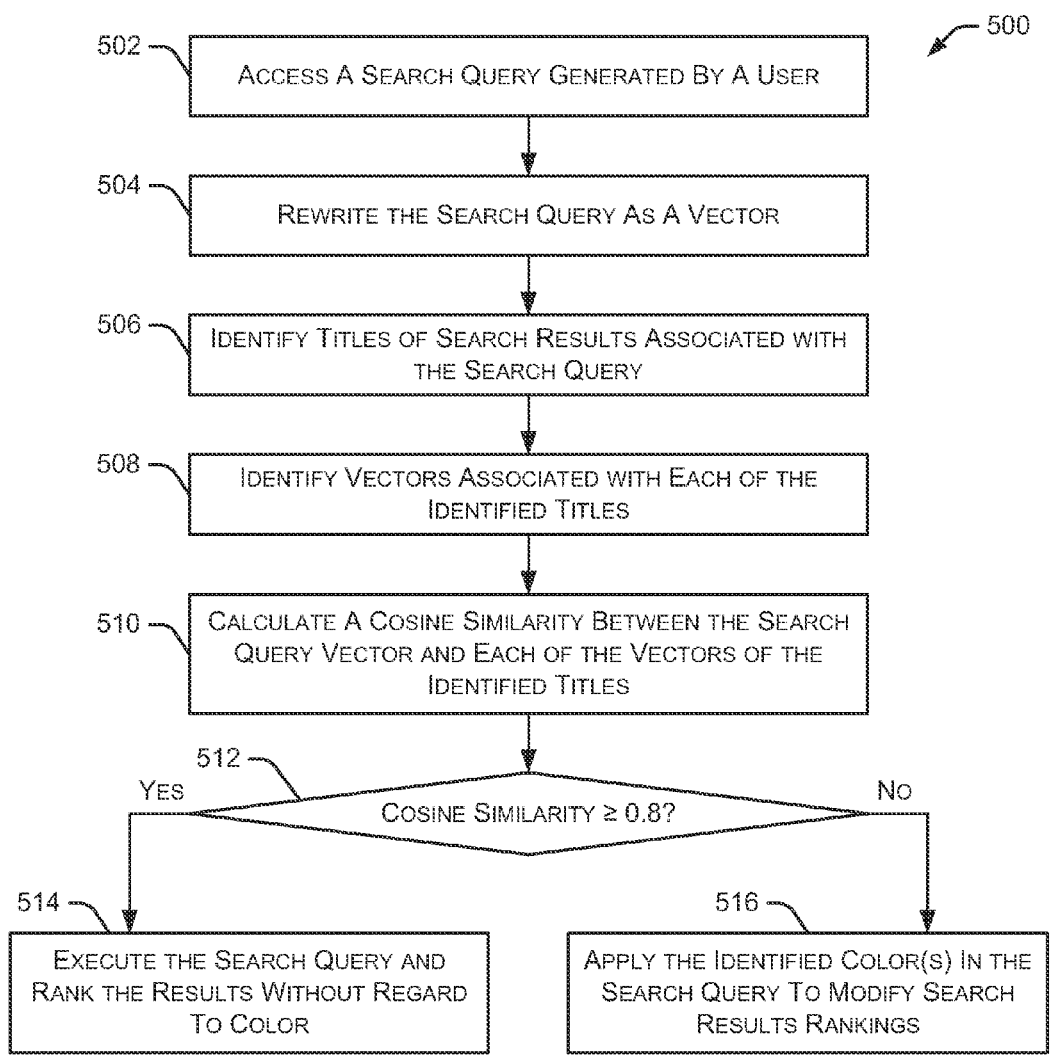
FIG. 5 is a flow diagram depicting an embodiment of a method for determining whether a user intended an actual color in a search query.

FIG. 5 is a flow diagram depicting an embodiment of a method 500 for determining whether a user intended an actual color in a search query. Initially, the method 500 accesses a search query generated by a user at 502 and rewrites the search query as a vector at 504. When rewriting the search query as a vector, each term in the search query is identified along with a number of occurrences of the term in the search query. For example, a search query "brown leather jacket" would have an associated vector [brown: 1, leather: 1, jacket: 1]. The method 500 continues by identifying titles of search results associated with the search query at 506. Additionally, the method 500 identifies vectors associated with each of the identified titles at 508. The vectors associated with the identified titles are written in the same format as the search query vector discussed above. In some embodiments, if a particular title does not have an associated vector, the method 500 creates a vector associated with the particular title. The method 500 calculates a cosine similarity between the search query vector and each of the vectors of the identified titles at 510. The cosine similarity determines a similarity between two vectors by measuring the cosine of the angle between the two vectors. The cosine of the angle between the two vectors provides an indication of whether the two vectors are pointing in similar directions.

The resulting value of the cosine similarity calculation mentioned above determines whether the user intended an actual color in the search query. In one embodiment, a cosine similarity of 0.8 is used as a threshold for determining whether the user intended an actual color in the search query. In this embodiment, if the cosine similarity is greater than or equal to 0.8 at 512, the method 500 presumes that the user did not intend an actual color in the search query. In this situation, the method 500 executes the search query and ranks the search results without regard to color at 514. However, if the cosine similarity is less than 0.8 at 512, the method 500 presumes that the user intended an actual color in the search query. In this situation, the method 500 applies the identified color (or colors) in the search query to modify the search results ranking at 516.

Figure 6:
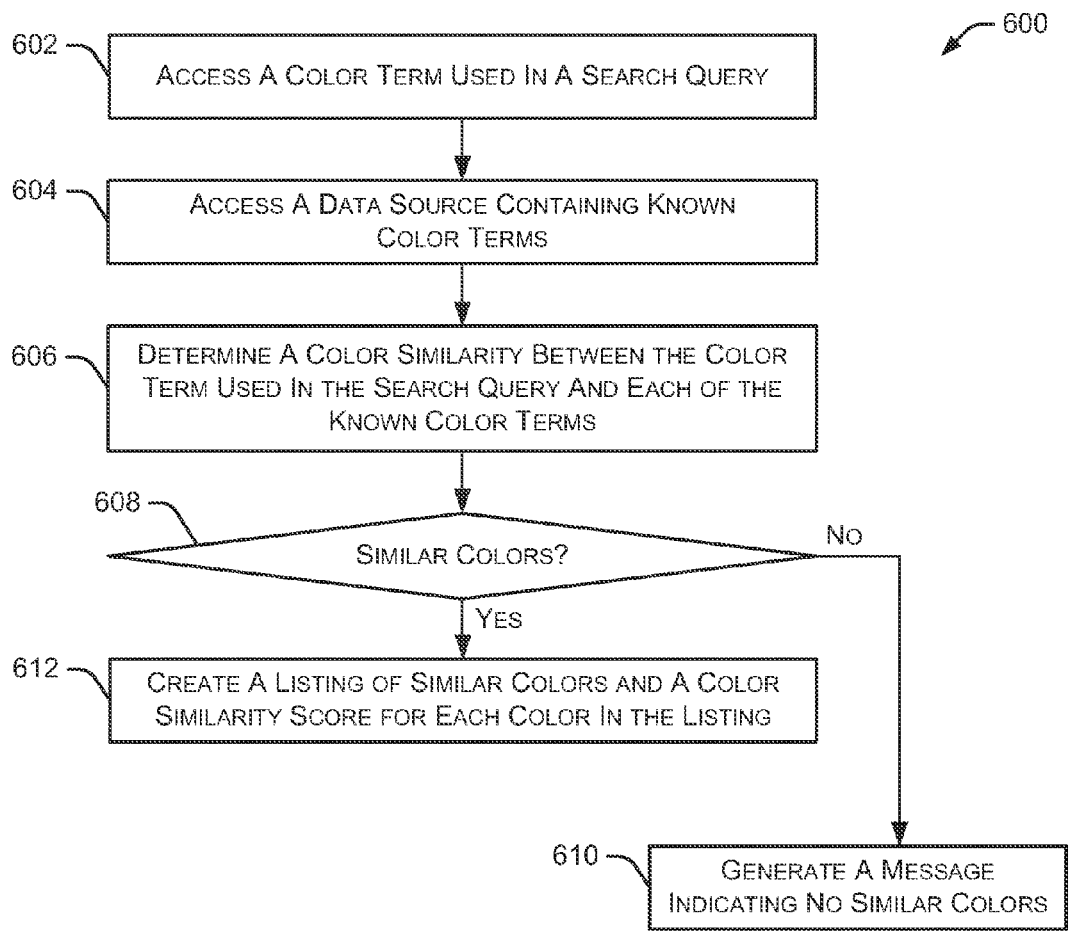
FIG. 6 is a flow diagram depicting an embodiment of a method for determining a similarity between two colors.

FIG. 6 is a flow diagram depicting an embodiment of a method 600 for determining a similarity between two colors. In some embodiments, the method 600 is performed by a color analysis service, such as color analysis service 116 (FIG. 1), or a color analysis module, such as color analysis module 212 (FIG. 2). Initially, the method 600 accesses a color term used in a search query at 602 and accesses a data source containing known color terms at 604. A color similarity is determined, at 606, between the color term used in the search query and each of the know color terms accessed from the data source. In some embodiments, a color similarity score is associated with each (color term-known color) pair that exhibits at least a minimal level of color similarity.

After determining a color similarity between the color term in the search query and each of the known color terms, the method 600 determines whether any pairs of colors are similar at 608. If none of the known color terms are similar to the color term in the search query, the method 600 generates a message indicating the lack of similar colors at 610. This message is communicated to a system or procedure that is handling the ranking of the search results. If, at 608, at least one of the known color terms are similar to the color term in the search query, the method 600 creates a listing of similar colors and a color similarity score for each color in the listing at 612. This listing is used by the system or procedure that is handling the ranking of the search results, as discussed herein.

In a particular example, a color term "red" is used in a search query. Several known colors are determined to have at least a minimal level of color similarity, such as "pink," "burgundy," and "maroon." In this example, a color similarity score is calculated for each of the (red-pink), (red-burgundy), and (red-maroon) pairs. The following table illustrates example color similarity scores for the three identified pairs. In this example, a lower similarity score represents a higher similarity between the two colors.

| Color Pair | Color Similarity Score |
| --- | --- |
| Red - Pink | 5 |
| Red - Burgundy | 12 |
| Red - Maroon | 9 |

In this example, the color pink has the highest similarity with the "red" color term in the search query. Thus, a product having a pink color is given a higher rank in the search results when compared to products having burgundy or maroon colors. Additionally, a product having a burgundy or maroon color is given a higher rank in the search results when compared to products having dissimilar colors, such as blue, green, silver, and yellow.

In a particular implementation, a color similarity score is calculated using a color difference formula published by the International Commission on Illumination (CIE), commonly referred to as CIE94. This formula determines a difference (or distance) between two colors.

Figure 7:
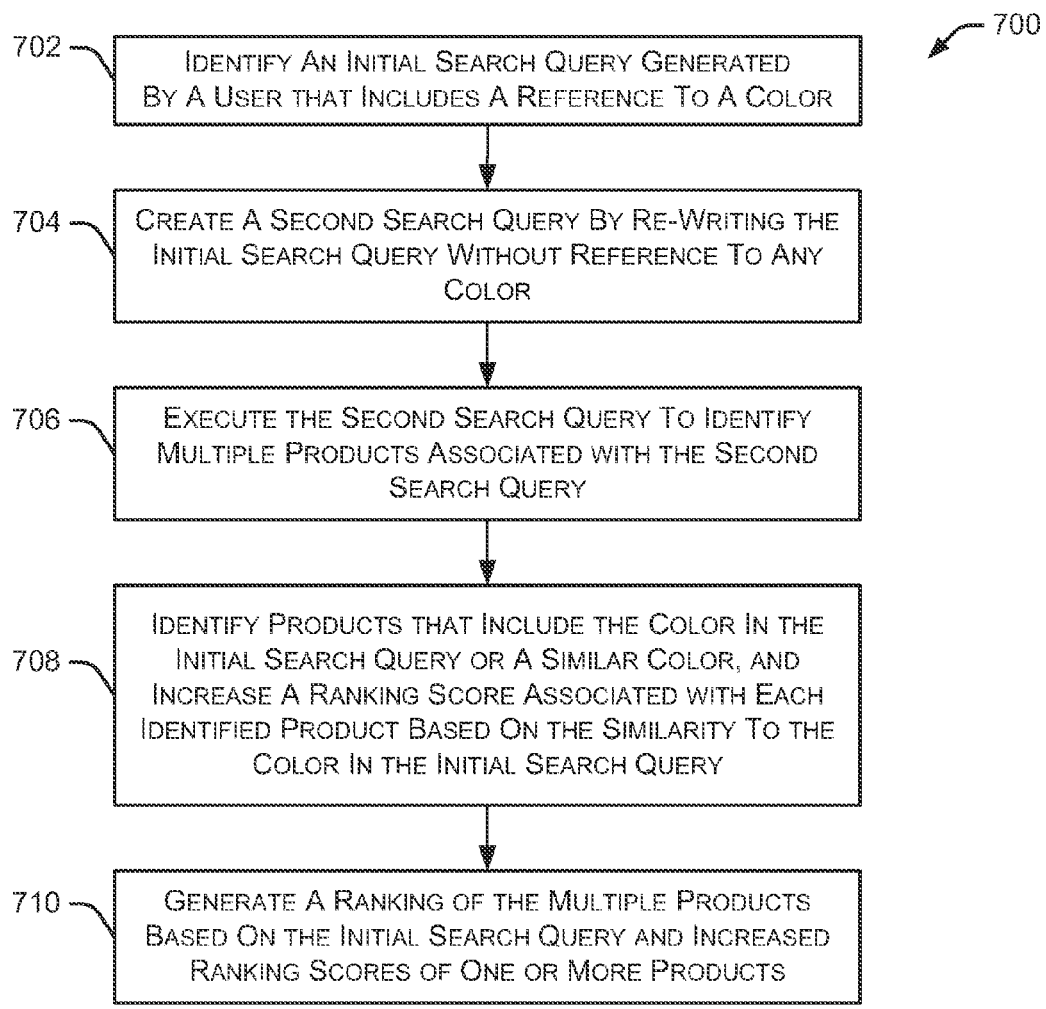
FIG. 7 is a flow diagram depicting an embodiment of a method for generating search results by executing a second search query.

FIG. 7 is a flow diagram depicting an embodiment of a method 700 for generating search results by executing a second search query. Initially, the method 700 identifies an initial search query generated by a user that includes a reference to a color at 702. The method 700 then creates a second search query by re-writing the initial search query without reference to any color at 704. For example, if the initial search query was "brown leather jacket", the second search query is "leather jacket." In some embodiments, the method 700 also removes any color-related terms from the second search query. Color-related terms include any terms that modify or characterize a color, such as "dark," "light," "bright," "dull," "pale," and the like.

The method 700 continues by executing the second search query to identify multiple products associated with the second search query at 706. The method continues at 708 by identifying products that include the color referenced in the initial search query (or a similar color). For example, if the initial search query was "brown leather jacket" and the second search query was "leather jacket", step 708 identifies products that include the color "brown." For each product that includes the color referenced in the initial search query ("brown" in this example), the ranking score associated with that product is increased based on the similarity to the color in the initial search query. For example, products that include the color "brown" will be given the greatest increase in ranking since the colors match. Similar colors (such as "tan") will receive an increase in ranking, but the ranking increase will be less than the increase for the exact color ("brown"). A specific example of this ranking increase is discussed below. After making any appropriate adjustments to individual product rankings, the method 700 generates a ranking of the multiple products based on the initial search query and the increased ranking scores of one or more products at 710. The ranking of the multiple products is then displayed to a user, communicated to another system, stored for future reference, and the like.

In one embodiment, the following procedure is utilized to determine an increase in a product ranking score based on an exact color or similar color in the multiple products discussed above with respect to FIG. 7. In this embodiment, the color referenced by the user in the search query is designated as "S". Using the CIE94 color difference formula mentioned above. This formula is also referred to as a "color distance formula" and a "color similarity formula." The searched color "S" is compared with multiple known colors (designated as "C") to identify colors that are similar to the searched color "S". The similarity between S and a particular color C is designated as dis(C,S). In this embodiment, the color S is considered to be similar to a color C if:

$$dis(C,S) < \text{MAX\_DISTANCE}$$

where MAX_DISTANCE is a constant representing the maximum distance (or maximum difference) between two colors in which the two colors are considered "similar." In an example implementation, MAX_DISTANCE=10.

For each color C that is considered "similar" to the searched color S, the procedure calculates a base increase for the color C using the following formula:

$$\text{base\_increase}(C) = \frac{-\text{MAX\_INCREASE}}{\text{MAX\_DISTANCE} \times dis(C, S)} + \text{MAX\_INCREASE}$$

where MAX_INCREASE is a constant representing the maximum increase that may be applied to a product ranking. In an example implementation, MAX_INCREASE=7. Using the above formula, if the color distance is zero (indicating maximum color similarity), the base_increase=MAX_INCREASE. And, if the color distance is MAX_DISTANCE, then the base_increase=0.

In this example, there is a listing of items (I1, I2, I3, ..., In) resulting from the re-written search query. Each item in the listing has an associated ranking score S1, S2, S3, ..., Sn. The procedure calculates the average score (designated as "avg_score") of the five items having the highest ranking score. A particular item may have multiple colors. In this situation, Ci is item i's color with maximum base increase. The score increase for item "i" is determined using the following formula:

$$\text{increase}(i) = \frac{\text{base\_boost}(Ci) \times Si}{\text{avg\_score}}$$

The above formula ensures that items at the top of the ranking list receive a greater increase than items at the bottom of the ranking list. This approach reduces the likelihood that an irrelevant item at the bottom of the list is moved to the top of the list simply due to a matching color. For example, a search query "red polo shirt" may return red pants near the bottom of the ranking list. The formula avoids the situation where the red pants are moved to the top of the ranking list for the search query "red polo shirt" simply because the pants contain the color term "red." The final ranking score for each item is determined by adding the initial ranking score for the item to the increased ranking (increase(i)) for the item. The final ranking scores for all of the items are then arranged in numerical order to generate the ranking of the multiple products.

Figure 8A:
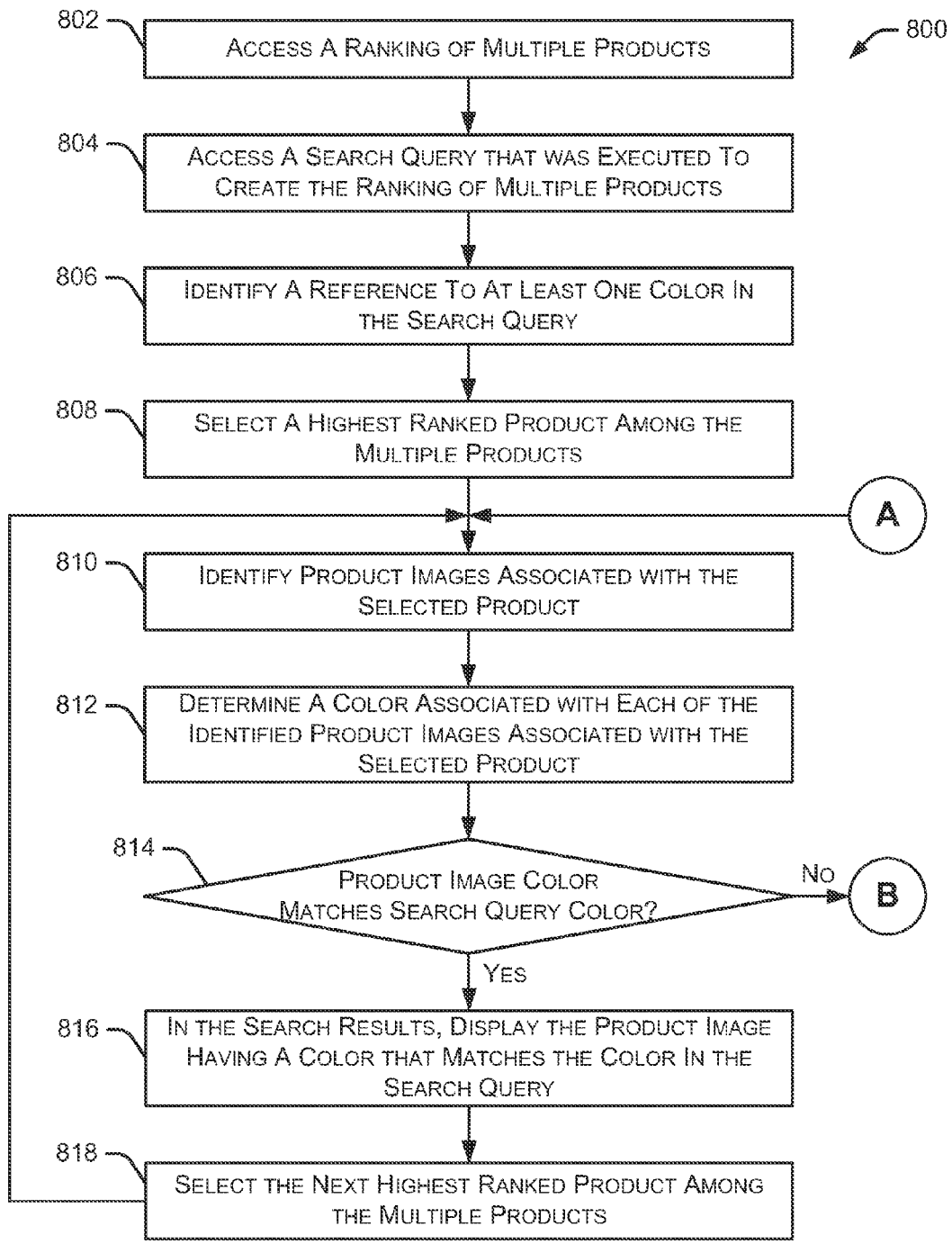
FIGS. 8A and 8B represent a flow diagram depicting an embodiment of a method for selecting a product image based on color.
Figure 8B:
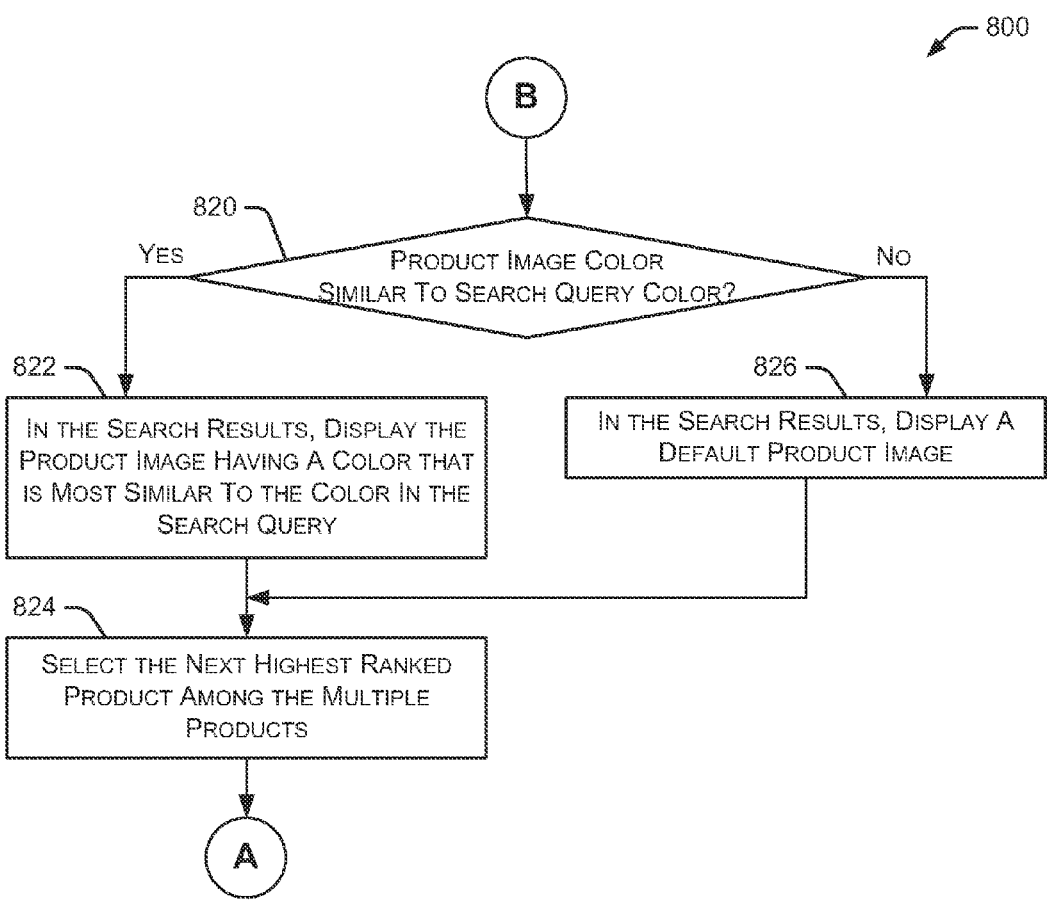

FIGS. 8A and 8B represent a flow diagram depicting an embodiment of a method 800 for selecting a product image based on color. As discussed herein, a user search query may include a reference to a color. In these situations, the method 800 selects a product image that has the same color as the color referenced in the search query. If there is no product image with the same color, the method 800 selects a product image with a similar color as the color referenced in the search query. The selected product image is then displayed to the user in the search results. By displaying a product image with the color in the search query, or at least a similar color, the user views products that are closest to the search query.

Initially, the method 800 accesses a ranking of multiple products at 802 based on, for example, execution of a search query provided by a user. The method 800 continues by accessing a search query that was executed to create the ranking of multiple products at 804. The search query is analyzed at 806 to identify a reference to at least one color in the search query. The method 800 selects a highest ranked product among the multiple products at 808. Various procedures for ranking the multiple products are discussed herein.

The method 800 continues by identifying product images associated with the selected product (e.g., the highest ranked product) at 810. In some situations, the selected product is available in multiple colors or multiple styles. For example, a particular shirt may be available in blue, red, white, gray, and black. Similarly, a shoe may be available with a low heel, medium heel, and high heel. Some products have multiple product images to display different versions of the product. The method 800 determines a color associated with each of the identified product images associated with the selected product at 812. In some embodiments, the color associated with a particular product image is determined based on metadata associated with the product image. For example, each product image may be stored as a file having a file name that includes the color. An example file name for a product image is "23442298_Red_180×180". In this example, the color of the product image (red) is determined by parsing the file name of the product image. The method 800 continues by determining whether any of the product images have a color that matches the search query color at 814. If not, the method 800 branches to FIG. 8B, as shown.

If at least one of the product images has a color that matches the search query color, that product image is selected for display in the search results at 816. As noted herein, displaying a product image having the color in the search query provides a positive result for the user who sees the product in the desired color. The method 800 continues by selecting, at 818, the next highest ranked product from among the multiple products (accessed at 802), and returns to 810 to identify product images associated with that product.

Referring to FIG. 8B, if none of the product images has a color that matches the search query color, the method 800 determines whether any of the product images have a color that is similar to the search query color at 820. Various procedures for determining color similarities are discussed herein. If there are no product image colors similar to the search query color, a default product image is displayed in the search results at 826.

If at least one of the product images has a color that is similar to the search query color, that product image is selected for display in the search results at 822. If multiple product images have a color that is similar to the search query color, the product image with the most similar color (e.g., closest color similarity) is selected for display in the search results. The method 800 continues by selecting, at 824, the next highest ranked product from among the multiple products (accessed at 802), and returns to 810 to identify product images associated with that product. This process continues until a product image is selected for each of the multiple products.

Although the present disclosure is described in terms of certain preferred embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the scope of the present disclosure.

The invention claimed is:

1. A method comprising:
accessing a ranking of multiple products associated with a search query;
identifying a reference to a requested color in the search query;
identifying a first product from the ranking of multiple products;
identifying a plurality of product images associated with the first product, each of the plurality of product images having a file name;
determining, from the file name, a product color associated with multiple of the plurality of product images;
calculating a base increase of the product color with respect to the requested color in the search query based on a predetermined threshold color distance and a predetermined threshold base increase;
determining a color similarity between the requested color in the search query and the product color for the multiple of the product images;
selecting, using one or more processors, a selected product image of the multiple product images that has an associated product color that is most similar to the requested color in the search query, the associated product color having a base increase greater than other one or more product colors of the multiple product images; and
displaying a default product image when a user did not intend an actual color by the requested color.

2. The method of claim 1, further comprising generating search results that include the selected product image.

3. The method of claim 2, further comprising communicating the search results to a device operated by the user.

4. The method of claim 2, further comprising causing to display the search results to the user.

5. The method of claim 1, wherein the reference to a requested color in the search query is a keyword in the search query.

6. The method of claim 1, the identifying of the reference to the requested color in the search query includes comparing each term in the search query with a listing of known color terms.

7. The method of claim 1, further comprising displaying a default product image when no product image has an associated color that is similar to the requested color in the search query.

8. The method of claim 1, further comprising analyzing the search query to determine whether the user associated with the search query intended an actual color.

9. A method comprising:
accessing a ranking of multiple products associated with a search query;
identifying a reference to a color in the search query;
for each of the multiple products:
identifying a plurality of product images associated with each product, each of the plurality of product images having associated metadata;
determining, from the associated metadata, using one or more processors, a color associated with each of the plurality of product images associated with each product, the each of the plurality of product images including a plurality of colors;
calculating a base increase of an individual color of the plurality of colors with respect to the color in the search query based on a predetermined threshold color distance and a predetermined threshold base increase;
selecting a product image of the plurality of product images that has an associated color that matches the color in the search query, the associated color having a base increase greater than other one or more colors of the plurality of colors of the product image; and
selecting a default product image when no product image has an associated color that is similar to the color in the search query.

10. The method of claim 9, further comprising generating search results that include the product image selected for each of the multiple products.

11. The method of claim 10, further comprising communicating the search results to a device operated by a user.

12. The method of claim 10, further comprising causing to display the search results to a user.

13. The method of claim 10, further comprising analyzing the search query to determine whether a user associated with the search query intended an actual color.

14. The method of claim 13, further comprising displaying a default product image when the user did not intend an actual color.

15. An apparatus comprising:
a memory to store data associated with at least one product image; and
one or more processors coupled to the memory, the one or more processors configured to:
access a ranking of multiple products associated with a search query;
identify a reference to a color in the search query;
identify a first product from the ranking of multiple products;

identify a plurality of product images associated with the first product, each of the plurality of product images having associated metadata comprising a file name;

determine, from the file name, a color associated with each of the plurality of product images that includes a plurality of colors;

calculating a base increase of an individual color of the plurality of colors with respect to the color in the search query based on a predetermined threshold color distance and a predetermined threshold base increase;

select a product image of the plurality of product images that includes an associated color that is most similar to the color in the search query, the associated color having a base increase greater than other one or more colors of the plurality of colors of the product image; and select a default product image when a user did not intend an actual color.

16. The apparatus of claim 15, the one or more processors further configured to generate search results that include the product image selected.

17. The apparatus of claim 16, the one or more processors further configured to cause a display of the search results to the user.

\* \* \* \* \*